Figure 1:
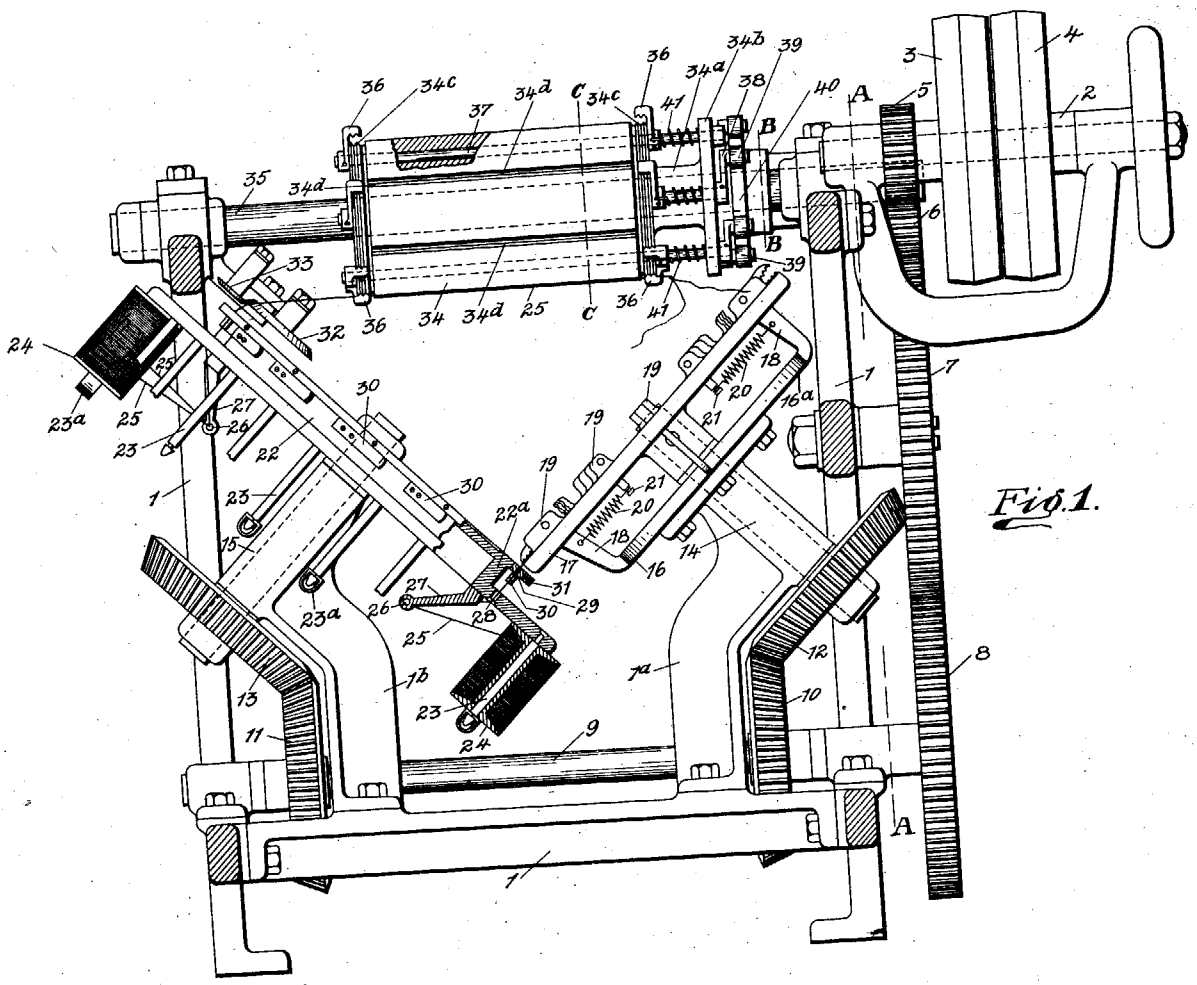

A. L. STEVENS.

MACHINE FOR MAKING TAGS AND THE LIKE.

APPLICATION FILED JAN. 26, 1914.

Reissued Aug. 31, 1915.

13,974.

3 SHEETS—SHEET 1.

Witnesses.
Charles D. Tewksbury
Isaac Krafsur

Inventor.
Arthur L. Stevens
By Chas. T. Hill
Attorney.

A. L. STEVENS.

MACHINE FOR MAKING TAGS AND THE LIKE.

APPLICATION FILED JAN. 26, 1914.

Reissued Aug. 31, 1915.

13,974.

3 SHEETS—SHEET 2.

Witnesses.
Charles B. Tewksbury
Isaac Krafsun

Inventor.
Arthur L. Stevens
By Chas. P. Spear
Attorney.

A. L. STEVENS.

MACHINE FOR MAKING TAGS AND THE LIKE.

APPLICATION FILED JAN. 26, 1914.

Reissued Aug. 31, 1915. 13,974.

3 SHEETS—SHEET 3.

Witnesses.

Charles B. Tewksbury

Isaac Krafsen.

Inventor.

Arthur L. Stevens

By Chas. J. Fidler

Attorney.

UNITED STATES PATENT OFFICE.

ARTHUR L. STEVENS, OF CHICAGO, ILLINOIS, ASSIGNOR, BY MESNE ASSIGNMENTS, TO SAFEGUARD TAG COMPANY, OF PORTLAND, MAINE, A CORPORATION OF MAINE.

MACHINE FOR MAKING TAGS AND THE LIKE.

13,974. Specification of Reissued Letters Patent. Reissued Aug. 31, 1915.

Original No. 1,014,916, dated January 16, 1912, Serial No. 383,168. Application for reissue filed January 26, 1914. Serial No. 814,419.

*To all whom it may concern:*

Be it known that I, ARTHUR L. STEVENS, a citizen of the United States, residing in the city of Chicago, county of Cook and State of Illinois, have invented new and useful Improvements in Machines for Making Tags and the like, of which the following is a specification, reference being had to the accompanying drawings.

My invention relates to that class of machines adapted to manufacture tags, having flexible material interposed between the strips of material composing the body of the tag.

The general method adopted in manufacturing such tags is to cause two strips of paper or other suitable material having cemented surfaces to pass between compression plates or rolls, causing said cemented surfaces to adhere to one another and to the flexible material which is interposed between said cemented surfaces prior to the application of such pressure. In many instances the machines heretofore used in the manufacture of such tags employ a pair of jaws at the end of an arm, or a device in the nature of a shuttle, both of which have a reciprocating motion for drawing the flexible material between the strips of paper or other material forming the body of the tag. During the manufacture of the tag such flexible material frequently becomes more or less displaced and consequently causes a defective tag.

One of my objects has been to provide a machine not having a reciprocating arm, but provided with rotary means whereby a plurality of strands of flexible material are constantly carried to a point where they are successively laid between and transversely to the strips of material composing the body of the tag, thus reducing the liability of displacement of the flexible material.

Another object is to enable the tags to be manufactured with greater rapidity, and thereby effect an economy in time and labor.

In the following specifications and accompanying drawings I have described a machine adapted to receive between the compression rolls two strips of material, each of which passes from a reel (not shown) over rolls used to cover the surface of each strip with cement. Said material is of sufficient width to form two tags.

As frequently it is desirable to interpose simultaneously more than one strip of flexible material between the strips forming the body of the tag, I have illustrated my invention as adapted to interpose two such strips simultaneously and transversely to the length of said strips forming the body of the tag at predetermined intervals, the flexible material so interposed being of sufficient length to extend beyond each edge of said strip so as to leave a free portion which may be used to attach the completed tag to an article. I do not, however, wish to limit myself to the exact construction herein shown and described, as it is obvious that my invention is adapted to insert one or more strips of flexible material, and by a proper adjustment of the several parts of the machine the principle herein disclosed may be adapted to a machine which will sever the flexible material close to the edges of the other material, and thus produce a sheet of reinforced material without the projecting portion of flexible material, which said sheet need not necessarily be cut into tags.

In the apparatus herein illustrated and described, after the flexible material has been laid in position and the strips forming the body of the tag have passed between the compression rolls the single strip thus formed is adapted to be run onto a drier and later cut, both transversely and longitudinally, thus forming tags having the flexible material running the entire length and extending beyond the end thereof.

I accomplish the objects hereinbefore mentioned by the means hereinafter set forth, and as illustrated in the accompanying drawings.

Figure 2:
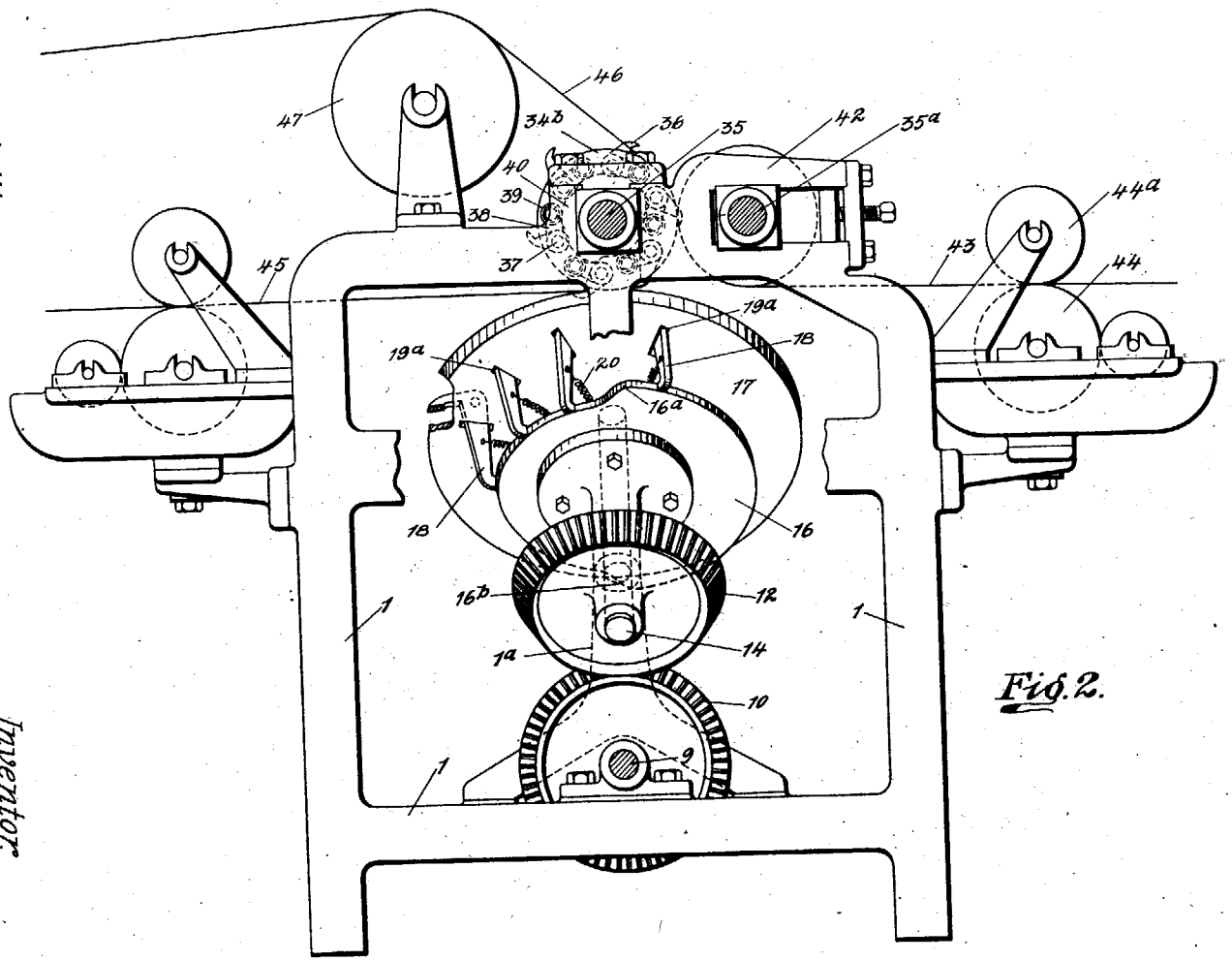
Figure 3:
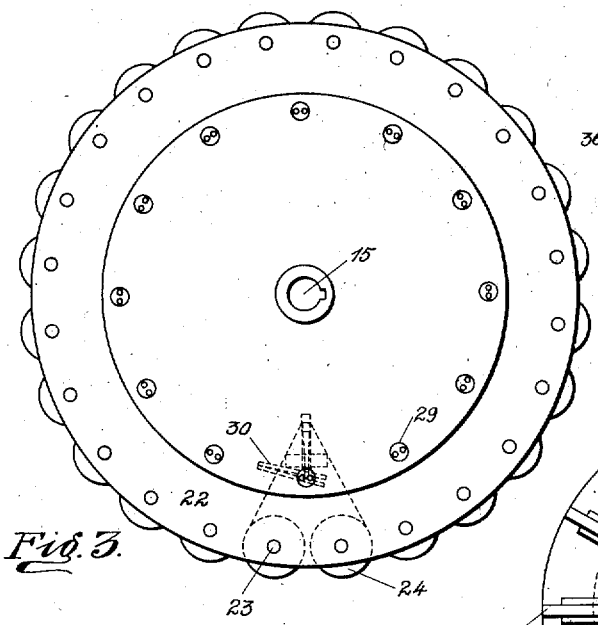
Figure 5:
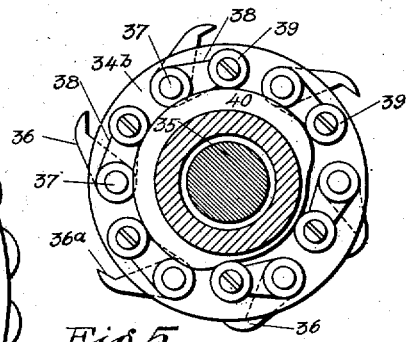
Figure 4:
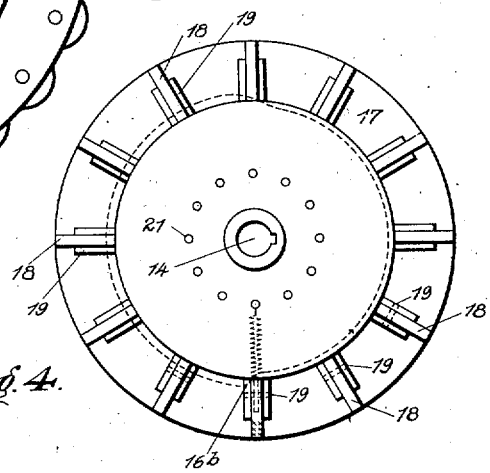
Figure 7:
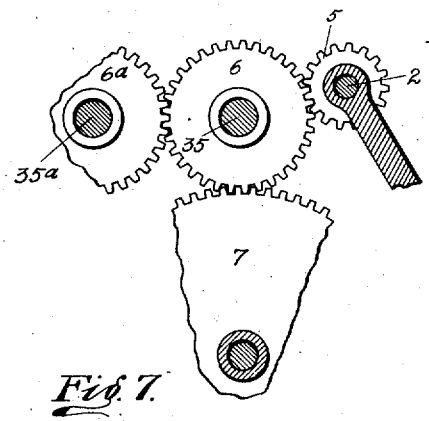
Figure 6:
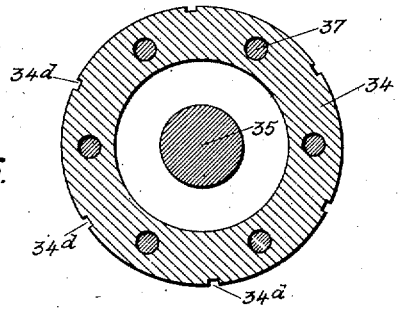

Figure 1 is an end elevation, some of the parts being shown in section. Fig. 2 is a sectional side view along line A A of Fig. 1, looking toward the left, with parts of the framework of the machine broken away. Fig. 3 is a plan view of the top side of disk 22, the dotted lines showing some of the parts on the under side thereof. Fig. 4 is a plan view of the top side of disk 17 with dotted lines showing cam plates 16 and certain parts on the under side of said disk. Fig. 5 is a sectional view along line B B of Fig. 1, looking toward the left. Fig. 6 is a sectional view of roll 34 along line C C of Fig. 1. Fig. 7 is a partial sectional view along line A A of Fig. 1 looking toward the right and showing in detail a part of the gearing.

1 represents the framework of the machine.

The driving mechanism comprises shaft 2 on which are driving pulley 3 and idler 4; small gear 5 rigidly attached to shaft 2 and in mesh with gear 6 which is attached to and actuates shaft 35; gear 6[a] attached to shaft 35[a] and in mesh with gear 6; intermediate gear 7, also in mesh with gear 6, meshes with gear 8 which is attached to shaft 9; mounted on shaft 9 are bevel gears 10 and 11 which respectively mesh with bevel gears 12 and 13; gear 12 being mounted on shaft 14 which revolves in suitable bearings on arm 1[a] and gear 13, being mounted on shaft 15 which revolves in suitable bearings on arm 1[b].

The object of the above described gears and shafting is to secure relatively different speeds for various parts of the machine which will be hereafter described in detail.

16 is a cam plate rigidly attached to arm 1[a].

17 is a disk rigidly attached to and actuated by shaft 14.

18, 18 are a series of levers placed at intervals around disk 17 and hinged at 19, 19. The upper arm of each lever is on the upper side of disk 17 while the lower arm of each extends downward through slot 19[a], 19[a] (Fig. 2) and contacts at its lower end with cam plate 16, thus forming gripping jaws. The outer and upper end of each lever 18 is preferably provided with a roughened surface on its under side where it contacts with the upper surface of disk 17, which is also preferably roughened at these points.

20, 20 are springs attached to post 21, 21, and the lower arm of levers 18, 18, and are utilized to keep the upper arm of said levers in contact with the upper surface of disk 17 except when said levers are actuated by cam plate 16. Cam 16 is so disposed on arm 1[a] that the lower arm of levers 18, 18 in the course of their rotation around said cam are brought into contact with the highest part of said cam at 16[a] just after they reach the point nearest roll 34, as is clearly shown in Fig. 2. By this arrangement the lower arm of each lever 18 is thrown forward against the action of spring 20, and the upper arm of each lever is lifted from contact with disk 17. In order to cause the upper arm of each lever to contact quickly at the proper time with disk 17, cam 16 is cut sharply away at 16[b] as shown by dotted lines (Figs. 2 and 4) which permits the lower arm of each lever to be pulled backward by reason of the tension of spring 20. It will be seen that by this method I provide a series of gripping jaws around disk 17 which successively open and close at predetermined points during the course of rotation of said disk, but it is obvious that numerous other devices can be adopted to accomplish the results thus obtained.

22 is a disk rigidly attached to and actuated by shaft 15. On this disk are a series of posts, 23, 23, which are preferably placed on the under side of said disk. Each of said posts is adapted to hold a spool or reel, 24, 24 of flexible material, 25, 25, such as string, tape, wire, metallic ribbon or other material suitable to be used to accomplish the objects and purposes above described and is provided with any suitable device, as for instance, spring clasp 23[a] for locking said spools to prevent them from sliding off said posts. In the accompanying drawings which, as previously stated, illustrate my invention as adapted to lay two strands of flexible material in position simultaneously, the material passes from the spools and through guiding eyes 26 in arm 27; one of said arms being provided for each pair of spools. Said material then passes to the base of said arm and through eye 28. Disk 22 is preferably so constructed that the under portion upon which are imposed spools 24, 24, extends beyond the upper portion as is shown in section 22[a] (Fig. 1).

30, 30 are tension springs which serve to hold material 25 taut as it passes between said springs and outward through double eye 29 in flange 31.

Shafts 14 and 15 are preferably mounted at such an angle to each other that the upper surfaces of disks 17 and 22 lie in planes which intersect. At the apex of the angle where said planes intersect disks 17 and 22 are in close proximity, yet with sufficient clearance to permit the free rotation of each. Disks 17 and 22 as herein shown are designed to revolve at the same speed.

Assuming that material 25 has been threaded from spool 24 to the upper side of disk 22 as above described, the operation of the machine will cause disks 17 and 22 to revolve until one of the eyes, guides or nozzles 29 reaches a point which brings the material 25 in line with one of the jaws formed by one of the levers 18. Cam 16 being sharply cut away at this point the jaws are closed suddenly and grasp and hold both strands of said material. The continued revolution of disks 17 and 22 with material 25 gripped as aforesaid causes said material to unwind from spools 24, 24, and as said disks are set at an angle to each other the length of the material between said disks as it passes upward is constantly increased until said material is gripped by fingers 36, 36 hereinafter described. Just after said material has been gripped by fingers 36, lever 18 is actuated by the part 16[a] of cam 16 and consequently releases its hold on said material. At the same time the other ends of said material pass between the knives 32 and 33 or any other suitable cutting device and said material is severed, leaving a sufficient portion of said material protruding from eye 29 to be again grasped by said jaws when the continued revolution of said disks shall have brought the material and jaws into proper position as hereinbefore described.

By providing a series of jaws around disk 17 and a corresponding number of eyes 29 through which protrudes material 25 and operating disks 17 and 22 at the same speed I obtain a succession of strands of flexible material constantly passing toward fingers 36, and the machine may be operated with a considerable degree of rapidity.

34 is a roll rigidly attached to shaft 35. Said roll has an extended hub 34[a] at one end which carries a flange 34[b]. Said flange acts as a bearing for one end of rocker shafts 37, 37 which extend lengthwise through roll 34 and rotate therewith. Each end of roll 34 also forms a bearing for shafts 37, 37 and the surface upon which fingers 36 close may be roughened as at 34[c], 34[c] so as to insure a tight grip when said fingers are closed. Roll 34 is also preferably constructed with grooves 34[d], 34[d] running lengthwise of the surface of said roll and so disposed that when the flexible material 25 is grasped by a set of fingers 36 said material 25 and one layer of the paper or other material composing the body of the tag will be forced into the corresponding groove, thus producing after the two strips of material are pressed and cemented together a strip having one side smooth while the added thickness of the flexible material will be prominent on the reverse side. I also preferably construct roll 34 with a smaller diameter than disk 17, which preferably involves the rotation of said roll at a considerably higher speed than that of disks 17 and 22. I do not limit myself to this construction, however, as it is apparent that it is only necessary to so adjust the relative speeds and proportions of said disks and roll, that whenever the flexible material has been carried by the rotation of said disks to the desired position, the rotation of roll 34 will have caused a set of fingers 36 to be in proper position to grasp said flexible material. One end of shafts 37 is formed as a crank 38, 38 which carries a roller 39, 39. These rollers are in contact with fixed cam plate 40 which may be held rigidly in place by any well known means.

41, 41 are springs which hold fingers 36 normally closed against the surface of ends 34[c] of roll 34.

By the rotation of roll 34 the rollers 39 are carried around cam 40 and when said rollers are in contact with the highest part of said cam the crank arms 38 will be forced outward against the action of springs 41 and will cause shafts 37 to have a limited rocker movement, thereby opening fingers 36 and leaving space between each of such fingers and the periphery of roll 34 as shown in Fig. 5. When in the course of such rotation rollers 39 are in contact with that portion of cam 40 which is cut away the crank arms 38 will be drawn over by reason of the action of spring 41, thereby causing finger 36 to close onto the periphery of roll 34 and form a tight grip therewith. I preferably form fingers 36 with a tip 36[a] (Fig. 5) extending at an angle from the body of said finger. It will be understood that cam 40 is so arranged that the contact of rollers 39 therewith will cause fingers 36 to be open when they approach the point where the flexible material 25 is in position to be grasped by fingers 36 as shown in Fig. 2. As the rotation of disks 17 and 22 brings material 25 into the open space between tip 36[a] and roll 34 the body of finger 36 acts as a stop to said material, and as said disks and roll continue to revolve holds said material 25 in position during the closing movements of fingers 36 and allows said fingers to grip said material before the opening of the jaws caused by contact with part 16[a] of cam 16 and the cutting of said material by knives 32 and 33. The body of said finger also serves to give said flexible material 25 a limited backward movement so as to place it in proper position to be forced into groove 34[d] when the tip 36[a] of finger 36 has been tightly closed on said material. After material 25 h s been cut at one end and released from lever 18 at the other, it is carried by fingers 36 and the rotation of roll 34 upward between roll 34 and adjustable compression roll 42. Roll 42 is mounted on shaft 35[a] which is actuated by gear 6[a].

43 represents one strip of paper or other suitable material passing between rolls 44 and 44[a] or other suitable device for covering the lower surface of such strip with cement, to the under side of roll 42 and thence upward between said roll 42 and roll 34. 45 represents the other strip of such material passing between similar cementing rolls to the under side of roll 34 and thence upward between said roll 34 and compression roll 42. Fingers 36, being beyond the pressing surface of roll 34, material 45 passes between said sets of fingers and as flexible material 25 is carried by the rotation of roll 34 said flexible material is laid in position between materials 45 and 43 and there held while said materials are being pressed and cemented together between rolls 34 and 42. The action of cam 40 causes fingers 36 to release their hold on material 25 as soon as the same has passed between rolls 34 and 42, and the materials 43, 45 and 25 after thus being cemented together pass in a continuous single strip 46 over drum 47 or any similar device, and are ready to be run onto a drier or reel. The method of applying the cement as herein illustrated is not essential to my invention as the same may be applied by any of numerous well known methods; neither do I limit myself to the precise construction and arrangement of the machine and its various parts as herein shown and described, as numerous changes both in construction and arrangement may be made and yet embody the scope of my invention.

In so far as the arrangement or disposition of threads, strands or the like between the paper strips or other elongated elements is concerned, and whether such threads or strands are crossed with other threads or strands is substantially immaterial to the present invention which concerns not the product but a machine adapted to accomplish the automatic disposition of flexible strands of a given material between preferably elongated elements of other material of any suitable description.

What I claim and desire to secure by Letters Patent is—

1. In an apparatus of the character described the combination of rotatable means for drawing out one or more strands of flexible material to the required length and conveying said flexible material to a certain position, other rotatable means to grasp said flexible material when in such position and to convey said flexible material between strips of other material, one or more of said strips of last mentioned material having a cemented surface, means for supporting and feeding said strips of last mentioned material to the point where said flexible material is brought between said strips and means for pressing said strips together after said flexible material has been laid between them.

2. In an apparatus of the character described the combination of a rotatable member carrying a strand of flexible material, another rotatable member provided with means to grip said flexible material, the rotation of said members drawing said material out to a predetermined length, other rotatable means to grasp said flexible material when it has been carried to a certain position during the rotation of said first mentioned rotatable members and lay the same between strips of other material adapted to form the body of a tag and means for supporting and feeding said strips of last mentioned material into position.

3. In an apparatus of the character described, in combination, a rotatable member having gripping jaws, another rotatable member carrying a strand of flexible material, means for supporting said members in such relative position that said flexible material when grasped by said jaws, will by the rotation of said members, be drawn out to a predetermined length, other rotatable means to grasp said material when it has been carried to a predetermined position by the rotation of said first mentioned rotatable members, and means for supporting and feeding to a certain position strips of material adapted to form the body of a tag.

4. In an apparatus of the character described the combination of rotatable means for drawing out a strand of flexible material and conveying it to a certain position, other rotatable means adapted to grasp said flexible material when it is in position and to convey it transversely between strips of other material, and means for supporting and feeding said strips of last mentioned material to the position where said flexible material is brought between said strips.

5. In an apparatus of the character described the combination of continuously rotating means for conveying one or more strands of flexible material to a predetermined position, a roll having a plurality of fingers to grasp said flexible material while it is in movement, means whereby a plurality of strips of other material for forming the body of a tag are supported and fed to a position where they contact with said roll, and means for causing said fingers to release said flexible material.

6. In an apparatus of the class described the combination of a continuously rotating member, means adapted to compress a plurality of strips of material for forming the body of an article between said means and said continuously rotating member, one or more fingers carried by said member, said fingers being adapted to grip one or more strands of flexible material and hold the same during the compression of said strips of other material, and means for causing said fingers to release their grip on said flexible material.

7. In an apparatus of the class described, the combination of a plurality of rolls to compress a plurality of strips of material having cemented surfaces, means for causing said strips to pass between said rolls longitudinally in continuous strips, a plurality of fingers around each end of one of said rolls, said fingers being adapted to grip a plurality of strands of flexible material and hold the same transversely to and between said strips of cemented material and means for causing said fingers to release their grip on said flexible material after said strips of cemented material have been compressed.

8. In an apparatus of the character described a rotatable member provided with means for supporting and guiding a strand of flexible material, another rotatable member, jaws on said last mentioned member adapted to grip said flexible material, means for supporting said rotatable members in such position relative to each other that said flexible material may be grasped by said jaws at a point where said rotatable members most closely approach each other and will by the rotation of said members be drawn out to a predetermined length when said material has by the rotation of said members been conveyed to the position where there is the greatest distance between said rotatable members, and means for releasing said flexible material.

9. The combination of a disk carrying a strand of flexible material, a disk having jaws, means for supporting said disks in such position relative to each other that said flexible material may be grasped by said jaws at the point where said disks most closely approach each other, means for rotating said disks and means for severing said flexible material after it has been carried by the rotation of said disks to a certain position.

10. The combination of a rotatable member carrying a plurality of strands of flexible material, another rotatable member provided with a plurality of jaws, shafts which incline toward each other and upon which said members are mounted, means for causing said jaws to grasp said material at a predetermined point, means for causing said jaws to release said material at a predetermined point, and means for severing said material simultaneously with its release from said jaws.

11. The combination of a plurality of rotatable members, means for holding said members at an angle to each other, means carried by one of said members for holding one or more strands of flexible material, one or more hinged jaws carried by said other member, means for causing said jaws to close upon and grasp said flexible material at a point when said material and jaws are near each other, means for causing said jaws afterward to open and to release said flexible material and means for severing said strands of flexible material when said material has been drawn out by the movement of said members to a predetermined length.

12. In an apparatus of the character described the combination of a rotatable member carrying one or more strands of flexible material, another rotatable member mounted on a shaft set at an angle to said other member, one or more hinged jaws carried by said last mentioned member, means for causing said jaws to close and grip said flexible material when said material is in proximity to said jaws, means for causing said jaws to open and release said flexible material, means for severing said flexible material when said material has been drawn out to the desired length by the rotation of said members, a revolving member provided with a plurality of fingers, means for causing said fingers to close upon and grip said flexible material and means for causing said fingers to open and release said flexible material after it has been carried by the revolution of said revolving member between a plurality of strips of material adapted to form the body of a tag.

13. In an apparatus of the class described the combination of a rotatable member, means carried by said member for holding one or more reels of flexible material, another rotatable member, one or more hinged, spring-controlled levers carried by said last mentioned member and forming jaws adjacent to the periphery of said last mentioned member, and a cam in contact with the lower part of said levers, said cam being so arranged that the jaw end of said levers will close and grip one end of said flexible material when said material is adjacent to said jaws and will trip said lever and cause the jaw end thereof to open and release said material, when by the rotation of said rotatable members said material has been drawn out to the required length.

14. The combination of a plurality of reels of flexible material, a plurality of spring-controlled hinged levers forming gripping jaws, means for holding said flexible material so that the free ends of said material will be toward said jaws when in proximity thereto, means for causing said reels and said jaws to rotate in planes whose axes intersect, a cam engaged by the lower arm of said levers and so disposed that the upper arm of said levers will grip said flexible material and hold said material during the rotation of said reels and jaws, until in consequence of such rotation said material has been drawn from said reels to the required length, and means to sever said flexible material after it has been so drawn out.

15. In an apparatus of the character described, in combination, a revolving member carrying one or more strands of flexible material, supporting or guiding means on said member for holding said flexible material so that the free ends thereof extend beyond said member, another revolving member provided with a plurality of spring-actuated hinged levers, the upper arms of said levers forming with the surface of said last mentioned member a series of jaws, a cam with which the lower arms of said levers are in contact, said cam being so placed that each set of jaws will close and grasp the projecting ends of said flexible material as each set of jaws in turn comes to a point in the rotation of said members where said jaws and material are in close proximity, said cam being also so disposed that said jaws will open and release said material after said material has been drawn out to the required length by reason of the rotation of said members, means for severing said material, a power driven roll, a plurality of rocker shafts carried by said roll, one or more spring-actuated fingers attached to each rocker shaft, a crank arm on each rocker shaft, a cam engaged by said crank arms, said last mentioned cam being so arranged that said fingers will grip said flexible material before it is released by said jaws and before it is severed and will permit said flexible material to be carried by said fingers to a certain point and will cause said fingers afterward to open and release said flexible material, and an adjustable compression roll.

16. In an apparatus of the character described, the combination of a power driven roll having a plurality of grooves extending lengthwise on the surface thereof, a plurality of fingers around each end of said roll, said fingers being adapted to open and close at predetermined intervals and when closed grasp a plurality of strands of flexible material, said material being forced during the closing of said fingers into one of said grooves adjacent to said fingers, and rotatable means for conveying said flexible material into position to be grasped by said fingers.

17. In an apparatus of the character described, the combination of a plurality of power driven rotatable members provided with means for carrying a plurality of strands of flexible material and placing said material in a certain position, a power driven roll provided with means for grasping said flexible material when in position, means for causing said flexible material to be severed and released from said rotatable members, grooves on said roll adapted to receive said material when it is grasped by the means on said roll, and means for releasing said material from the grasping means on said roll.

18. In an apparatus of the character described the combination of a plurality of rotatable members provided with means for carrying one or more strands of flexible material and placing said material in a certain position, a roll provided with means for grasping said flexible material when in position, means for causing said flexible material to be severed and released from said rotatable members and means for releasing said material from the grasping means carried by said roll.

19. In an apparatus of the character described the combination of a rotatable member provided with means for carrying one or more strands of flexible material, another rotatable member provided with means to grasp said flexible material, a revolving member having means for grasping said flexible material after the rotation of said rotatable members has carried said material to a predetermined position, there being grooves on said revolving member adjacent to the grasping means carried by said member, and a compression roll in proximity to said revolving member.

20. In an apparatus of the character described the combination of a plurality of rotatable members provided with means for carrying one or more strands of flexible material to a certain position, a roll provided with means for grasping said flexible material when in position, means for causing said flexible material to be severed and released from said rotatable members, a compression roll adjacent to said other roll, means for supporting and feeding strips of other material between said rolls, and means for releasing said flexible material from the grasping means on said first mentioned roll after said material has passed between said rolls.

21. In an apparatus of the character described the combination of a plurality of rotatable members provided with means for carrying one or more strands of flexible material and placing said material in a certain position, a revolving member provided with means for grasping said flexible material when in position, means for causing said flexible material to be severed and released from said rotatable members and means for releasing said material from the grasping means carried by said revolving member.

22. In an apparatus of the character described the combination of a rotatable member provided with means for carrying one or more strands of flexible material, another rotatable member provided with means to grasp said flexible material, a revolving member having means for grasping said flexible material after the rotation of said rotatable members has carried said material to a predetermined position, and means for exerting pressure against said revolving member.

23. In an apparatus of the character described the combination of a rotatable member having means for holding one or more strands of flexible material, another rotatable member having means to grasp said flexible material, a revolving member having means for grasping said flexible material when the rotation of said rotatable members has carried said material to a certain position, means for supporting and feeding a plurality of strips of material adapted to form the body of a tag to a point where said strips will come into contact with said revolving member, and means between which and said revolving member said strips of last mentioned material and said flexible material may be compressed.

24. In an apparatus of the class described, the combination of means for supporting and feeding to a certain position strips of material capable of forming the body of a tag, continuously rotating means carrying a strip of flexible material with it as it is rotated and coöperating with said first mentioned means to interpose the flexible strip transversely between said tag forming strips and beyond one edge thereof, and means for compressing said materials after said flexible strip has been laid between the tag forming strips.

25. In an apparatus of the class described the combination of means for supporting and feeding to a certain position strips of material capable of forming the body of a tag, continuously rotating means for drawing out a succession of strands from a continuous length of flexible material and coacting with said first mentioned means to lay the said strands at predetermined distances transversely between said strips of other material and beyond one edge thereof, and a roll adapted to compress said strips of tag material after said flexible material has been laid in position.

26. In a machine of the class described, in combination, means for continuously feeding a plurality of strips or layers of flexible material in coinciding condition and for cementing the same together to form a single sheet or layer composed of a plurality of plies, and rotatable means carrying a length of string or other flexible material with it as it is rotated and comprising parts coöperating with parts of said feeding means for interposing transversely between said strips or sheets in their ununited condition and beyond one edge thereof said length of string or other flexible material substantially as described.

27. In an apparatus of the character described, in combination, a rotatable member carrying a strand of flexible material, a rotatable member provided with means to grasp said flexible material and, coöperating with the first mentioned rotatable member, to form a substantially straight length of the flexible material extending between said members in a substantially taut condition, and rotatable means to grasp said taut length of flexible material at different points intermediate said members and hold the portion of the flexible members thus grasped in its substantially taut position substantially as described.

28. A machine for making paper and the like having an inclosure of crossing threads, comprising a pair of continuously rotating pressure rolls, spools having threads wound thereon, means for unwinding, stretching and feeding the threads one after the other to at least one of the pressure rolls, and a cutting device which cuts off the thread taken hold of by at least one of the said rolls.

29. A machine for the production of a fabric having an inclosure of crossing threads, the said machine comprising a pair of pressure rolls, spools having threads wound thereon, and means co-acting with at least one of said pressure rolls for unwinding the threads from said spools and introducing them between said pressure rolls, said unwinding means including two members rotating to draw said threads out by their joint rotational action, the thread in engagement with said members being placed under tension by said action.

30. In an apparatus for laying in strands of flexible material between other material, the combination of a rotatable member carrying a strand of flexible material, another rotatable member provided with means to grip said flexible material, the rotation of said members drawing said material out to a predetermined length, other rotatable means to grasp said flexible material when it has been carried to a certain position during the rotation of said first mentioned rotatable members and lay the same between elongated elements of other material, and additional means for supporting and feeding in part at least, said elongated elements into position.

31. In an apparatus for laying in strands of flexible material between other material, the combination of a rotatable member carrying a strand of flexible material, another rotatable member provided with means to grip said flexible material, the rotation of said members drawing said material out to a predetermined length means to grasp said flexible material when it has been carried to a certain position by the rotation of said rotatable members, and co-acting means to support and feed elongated elements of determined material and to lay said flexible material between said elongated elements.

32. In an apparatus for laying in strands of flexible material between other material, the combination of a rotatable member carrying a strand of flexible material, another rotatable member provided with means to grip said flexible material, the rotation of said members drawing said material out to a predetermined length, means to grasp said flexible material when it has been carried to a certain position by the rotation of said rotatable members, co-acting means to support and feed elongated elements of determined material and to lay said flexible material between said elongated elements, and means for severing said strands of flexible material.

33. In a machine of the class described, in combination, means for feeding a plurality of strips or layers of flexible material in coinciding condition and for cementing the same together to form a single sheet or layer composed of a plurality of plies, and truly continuously rotating means carrying a length of string or other flexible material having severed ends with it as it is rotated and coöperating with said feeding means to effect the interposition transversely between said strips or sheets, and beyond one edge thereof, of said length of string or other flexible material with one of the severed ends thereof beyond said edge, substantially as described.

34. In an apparatus for laying strands of flexible material into engagement with other material, the combination of rotatable members one at least of which is continuously rotated, means to supply a strand of said flexible material to said rotatable members, said members having provisions to draw out said strand of flexible material into determined lengths by the rotation of at least one of said members, and means for bringing said other material and said determined lengths of flexible material into engagement.

35. A machine for the production of a fabric having an inclosure of strands between other material, the said machine comprising a spool having a strand wound thereon, and means to bring said other material and determined separate lengths of said strand into normally inseparable engagement, said means including two members rotating to unwind said strand from said spool into said lengths by their joint rotational action and pressure rolls to press sheets of said other material together upon said determined lengths of strand.

36. A machine for the production of a fabric having an inclosure of strands between other material, the said machine comprising a spool having a strand wound thereon, and means to bring said other material and determined separate lengths of said strand into normally inseparable engagement, said means including two members rotating to unwind said strand from said spool into said lengths by their joint rotational action and pressure rolls to press sheets of said other material together upon said determined lengths of strand, the axes of rotation of said members being out of direct alinement with each other.

37. In a machine for the production of a fabric having an inclosure of crossing wires, two disks adapted to rotate at the same speed in opposite directions, wire spools carried by one of said disks, and nozzles provided at the circumference of said disk and to which the wires are led from said spools.

38. A machine for the production of a fabric having an inclosure of crossing wires, the said machine comprising two disks adapted to rotate at the same speed in opposite directions, wire spools carried by one of said disks, nozzles at the edge of said disk to each of which a wire is led from one of said spools, grippers carried by the other disk, each gripper being open when opposite to a nozzle of the first mentioned disk to permit the wire projecting out of said nozzle to enter the gripper, and means for closing the gripper to cause the same to grasp the wire.

39. A machine for the production of a fabric having an inclosure of crossing wires, the said machine comprising two disks adapted to rotate at the same speed in opposite directions, wire spools carried by one of said disks, a corresponding number of grippers carried by the other disk for grasping the wires and unwinding them from the spools, and brake devices on the disk carrying the wire spools for retarding the rotation of said wire spools and subjecting the wires being unwound from said spools to tension.

40. A machine for the production of a fabric having an inclosure of crossing wires, the said machine comprising two disks adapted to rotate at the same speed in opposite directions, wire spools carried by one of said disks, grippers on the other disk which seize the wire and unwind it from the spools, and a guide into which the projecting end of the wire enters, the said guide directing the end of the wire between the jaws of the grippers.

41. A machine for the production of a fabric having an inclosure of wires between the covering webs, the said machine comprising spools carrying the transverse wires, means for unwinding the wires from said spools, rotating rolls between which the said wires are introduced, and a cutting device at the side of the rotating rolls which cuts off the wires introduced between said rolls.

ARTHUR L. STEVENS.

Witnesses:
A. L. Toole,
M. Scott.